United States Patent [19]
Schantz et al.

[11] Patent Number: 5,567,991
[45] Date of Patent: Oct. 22, 1996

[54] ELECTRIC VEHICLE RELAY ASSEMBLY USING FLEXIBLE CIRCUIT CONNECTOR COUPLING THE RELAY TO THE RELAY CIRCUIT

[75] Inventors: David L. Schantz, Ellicott City; James H. DeOms, Glen Arm; Ronnie L. Starling, Columbia; Michael J. Ankrom, Baltimore, all of Md.

[73] Assignee: Northrop Grumman Corporation, Los Angeles, Calif.

[21] Appl. No.: 258,117

[22] Filed: Jun. 10, 1994

[51] Int. Cl.[6] ................................................ H01R 9/09
[52] U.S. Cl. .......................... 307/10.1; 361/776; 439/77
[58] Field of Search .................................. 307/9.1, 10.1; 363/56, 58, 57, 55, 131, 132, 71; 318/439, 254, 138; 180/65.8; 310/71, DIG. 6; 320/1; 174/254, 268; 439/67, 77; 361/749, 807, 819, 776

[56] References Cited

U.S. PATENT DOCUMENTS

| | | | |
|---|---|---|---|
| 3,790,816 | 2/1974 | Berman | 180/65.8 |
| 4,217,017 | 8/1980 | Huebner | 439/77 |
| 4,371,824 | 2/1983 | Gritter | 363/56 |
| 5,402,045 | 3/1995 | Mori | 318/254 |
| 5,430,636 | 7/1995 | Kachi | 363/58 |

*Primary Examiner*—William M. Shoop, Jr.
*Assistant Examiner*—Richard T. Elms
*Attorney, Agent, or Firm*—Philip A. Florenzo

[57] ABSTRACT

An electric vehicle relay assembly including a main relay and a flexible circuit electrically connected to the main relay. The relay assembly further includes a connection for mounting the flexible circuit onto the main relay and a wiring board affixed to the flexible circuit. The flexible circuit compensates for mechanical tolerance errors within the connection. The wiring board includes relay circuitry electrically connected to the flexible circuit.

8 Claims, 7 Drawing Sheets

ELECTRIC VEHICLE RELAY ASSEMBLY USING FLEXIBLE CIRCUIT CONNECTOR COUPLING THE RELAY TO THE RELAY CIRCUIT

RELATED APPLICATIONS

The following identified U.S. patent applications are filed on the same date as the instant application and are relied upon and incorporated by reference in this application.

U.S. patent application entitled "Flat Topping Concept" U.S. application No. 08/258,295; Issued as U.S. Pat. No. 5,475,581;

U.S. patent application entitled "Electric Induction Motor And Related Method Of Cooling" application No. 08/442,708; Pending;

U.S. patent application entitled "Automotive 12 Volt System For Electric Vehicles" application No. 08/258,142; Pending;

U.S. patent application entitled "Direct Cooled Switching Module For Electric Vehicle Propulsion System" application No. 08/258,027; Pending;

U.S. patent application entitled "Electric Vehicle Propulsion System" application No. 08/258,301; Pending;

U.S. patent application entitled "Speed Control and Bootstrap Technique For High Voltage Motor Control" application No. 08/258,294; Abandoned;

U.S. patent application entitled "Vector Control Board For An Electric Vehicle Propulsion System Motor Controller" application No. 08/258,306; Pending;

U.S. patent application entitled "Digital Pulse Width Modulator With Integrated Test And Control" application No. 08/258,305; Pending;

U.S. patent application entitled "Control Mechanism For Electric Vehicle" issued as U.S. Pat. No. 5,463,294;

U.S. patent application entitled "Improved EMI Filter Topology for Power Inverters" application No. 08/258,153; Pending;

U.S. patent application entitled "Fault Detection Circuit For Sensing Leakage Currents Between Power Source And Chassis" application No. 08/258,179; Issued as U.S. Pat. No. 5,481,194;

U.S. patent application entitled "Three Phase Power Bridge Assembly" application No. (081 258 033); Pending;

U.S. patent application entitled "Electric Vehicle Propulsion System Power Bridge With Built-In-Test" application No. 08/258,034; Pending;

U.S. patent application entitled "Method For Testing A Power Bridge For An Electric Vehicle Propulsion System" application No. 08/258,178; Pending;

U.S. patent application entitled "Electric Vehicle Power Distribution Module" application No. 08/258,157; Pending;

U.S. patent application entitled "Electric Vehicle Chassis Controller" application No. 08/258,628; Pending;

U.S. patent application entitled "Electric Vehicle System Control Unit Housing" application No. 08/258,563; Abandoned;

U.S. patent application entitled "Low Cost Fluid Cooled Housing For Electric Vehicle System Control Unit" application No. 08/258,299; Abandoned;

U.S. patent application entitled "Electric Vehicle Coolant Pump Assembly" application No. 08/258,296; Pending;

U.S. patent application entitled "Heat Dissipating Transformer Coil" application No. 08/258,141; Issued; as U.S. Pat. No. 5,469,124;

U.S. patent application entitled "Electric Vehicle Battery Charger" application No. 08/258,154; Pending.

BACKGROUND OF THE INVENTION

Field of the Invention

The present invention relates to an electric vehicle. More particularly, the invention relates to electric vehicle relay assemblies. While the invention is subject to a wide range of applications, it is especially suitable for use in an electric vehicle propulsion system; and will be particularly described in that connection.

Description of the Related Art

For an electric vehicle to be commercially viable, its cost and performance should be competitive with that of its gasoline-powered counterparts. Typically, the vehicle's propulsion system and battery are the main factors which contribute to the vehicle's cost and performance competitiveness.

Generally, to achieve commercial acceptance, an electric vehicle propulsion system should provide the following features: (1) vehicle performance equivalent to typical gasoline-powered propulsion systems; (2) smooth control of vehicle propulsion; (3) regenerative braking; (4) high efficiency; (5) low cost; (6) self-cooling; (7) electromagnetic interference (EMI) containment; (8) fault detection and self-protection; (9) self-test and diagnostics capability; (10) control and status interfaces with external systems; (11) safe operation and maintenance; (12) flexible battery charging capability; and (13) auxiliary 12 volt power from the main battery. In prior practice, however, electric vehicle propulsion system design consisted largely of matching a motor and controller with a set of vehicle performance goals, such that performance was often sacrificed to permit a practical motor and controller design. Further, little attention was given to the foregoing features that enhance commercial acceptance.

For example, an electric vehicle must provide a relay to interrupt the power supplied from the battery to the control circuitry that applies current to the motor. In conventional relay circuits, when power is initially supplied, i.e. the relay switch is closed, a large inrush current flows into a large capacitance across the link of an inverter of the control circuitry. Because the capacitor represents a short circuit to the power source when the power is first supplied, large current can flow into the inverter and damage the capacitor across the link. The large inrush current may also disturb the power source and other units using that power.

SUMMARY OF THE INVENTION

Accordingly, the present invention is directed to an electric vehicle relay assembly that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof, as well as the appended drawings.

To achieve these and other advantages and in accordance with the purpose of the invention, as embodied and broadly described herein, the invention provides an electric vehicle relay assembly including a main relay and a flexible circuit electrically connected to the main relay. The relay assembly further includes connection means for mounting the flexible circuit onto the main relay and a wiring board affixed to the flexible circuit. The wiring board includes relay circuitry electrically connected to the flexible circuit for controlling the main relay.

In another aspect of the invention, the relay assembly further includes a precharge relay electrically connected to the relay circuitry for precharge of an input capacitor of an electric vehicle motor controller.

DESCRIPTION OF THE DRAWINGS

The accompanying drawings are included to provide a further understanding of the invention and are incorporated in and constitute a part of this specification, illustrate a preferred embodiment of the invention, and, together with a description, serve to explain the principles of the invention.

DESCRIPTION OF THE PREFERRED EMBODIMENT

Figure 1:
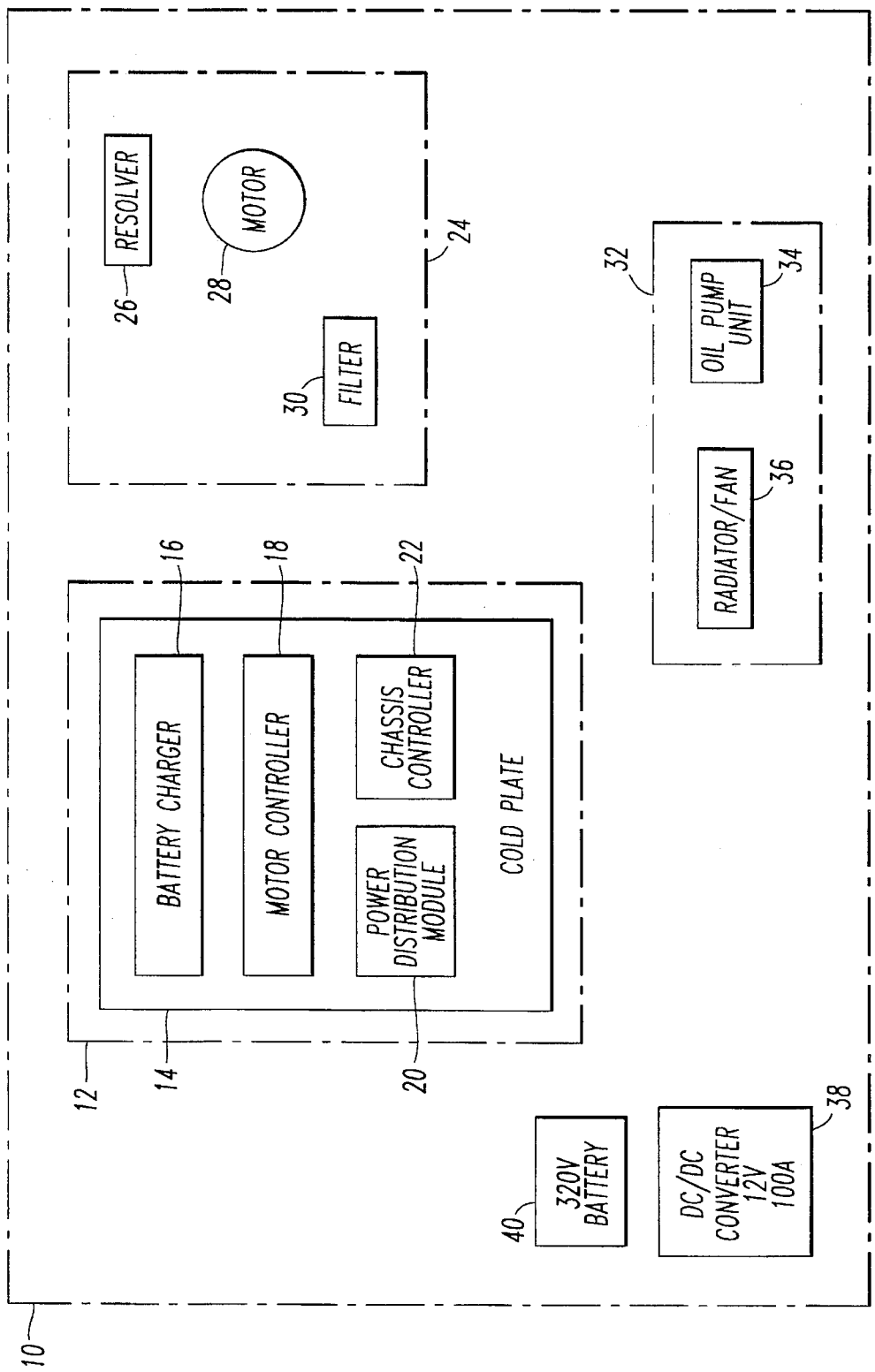
FIG. 1 is a block diagram of an electric vehicle propulsion system in which the electric vehicle relay assembly according to the present invention is used.

Reference will be made in detail to the present preferred embodiment of the invention, examples of which are illustrated in the accompanying drawings. Like reference numerals refer to like parts in the various Figures of the drawings.

The present invention, which relates to an electric vehicle relay assembly, will be discussed with respect to an electric vehicle propulsion system 10 as shown in FIG. 1. The electric vehicle propulsion system 10 comprises a system control unit 12, a motor assembly 24, a cooling system 32, a battery 40, and a DC/DC converter 38. The motor assembly 24 includes a resolver 26, a motor 28, and a filter 30. The cooling system 32 includes an oil pump unit 34 which pumps coolant through a hollow cold plate 14, the motor 28 and a radiator/fan 36. The system control unit 12 includes the cold plate 14. Heat-generating electrical components including a battery charger 16, motor controller 18, power distribution module 20, and chassis controller 22 are mounted in thermal contact with the cold plate 14.

Figure 2:
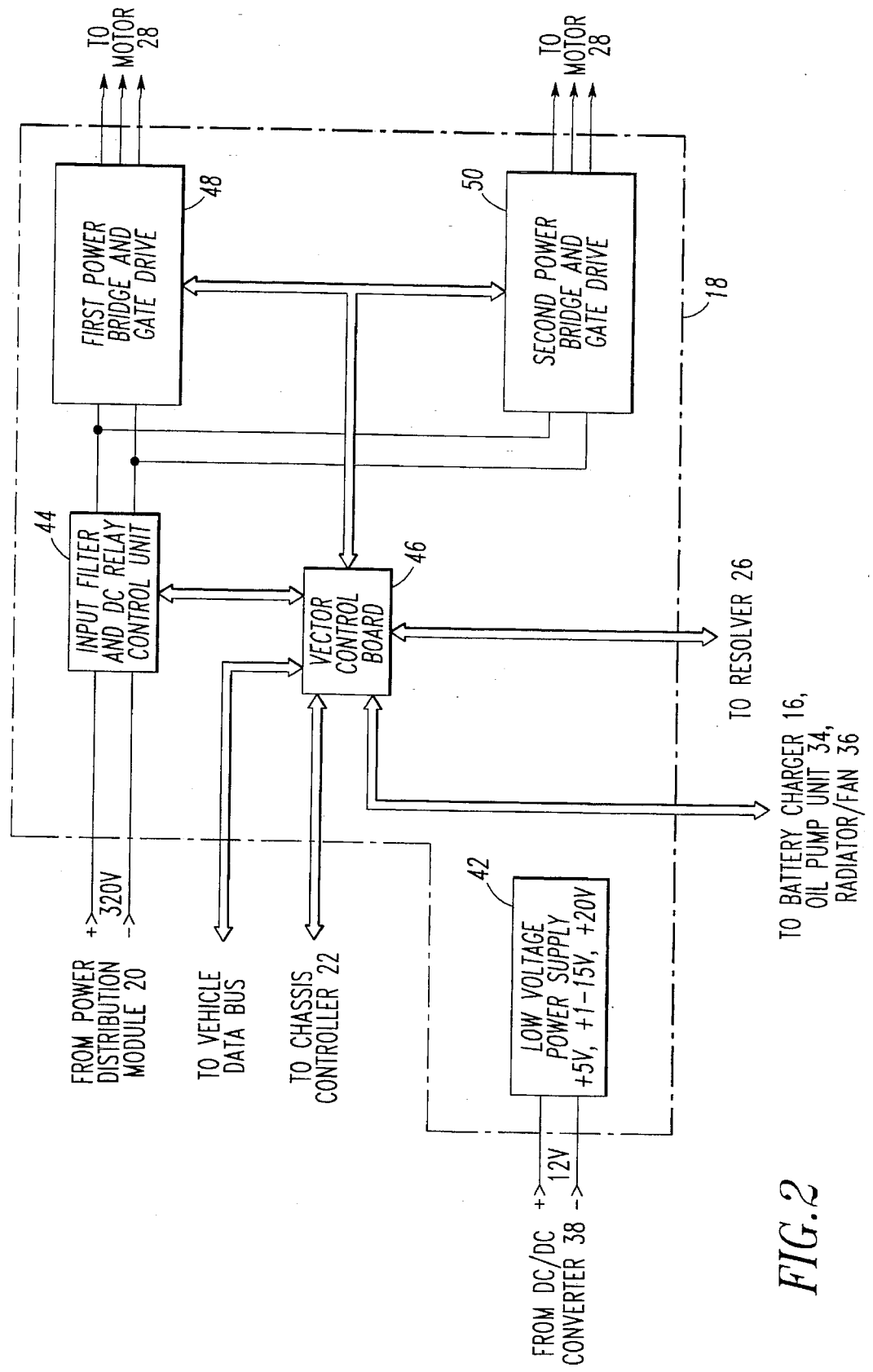
FIG. 2 is a functional diagram of the motor controller of the electric vehicle propulsion system of FIG. 1.

As shown in FIG. 2, the input filter and DC relay control unit 44 is included in the motor controller 18, which also includes a low voltage power supply 42, a vector control board 46, and first and second power bridges 48 and 50, respectively.

The low voltage power supply 42 converts a 12 volt output from the DC/DC converter 38 to provide +5V, +/−15V, and +20V outputs to the input filter and DC relay control unit 44, the vector control board 46, the first power bridge 48, and the second power bridge 50. The low voltage power supply 42 can comprise a commercially available power supply as is known in the art.

The vector control board 46 comprises a microprocessor based digital and analog electronics system. As its primary function, the vector control board 46 receives driver-initiated acceleration and braking requests from the chassis controller 22. The vector control board 46 then acquires rotor position measurements from the resolver 26 and current measurements from the first and second power bridges 48 and 50, respectively, and uses these measurements to generate pulse width modulated (PWM) voltage waveforms for driving the first and second power bridges 48 and 50, respectively, to produce the desired acceleration or braking effects in the motor 28. The PWM voltage waveforms are generated in accordance with a control program which is designed to result in a requested torque output. The vector control board 46 also has the function of controlling the input filter and DC relay control unit 44, the oil pump unit 34, the radiator/fan 36, the battery charger 16, built in test circuitry, vehicle Communication, and fault detection.

Each of the first and second power bridges 48 and 50, respectively, includes insulated gate bipolar transistor (IGBT) switching circuits and associated gate drive circuits for applying drive currents to each of the windings of the motor 28. Preferably, each of the first and second power bridges 48 and 50, respectively, provides half the total motor current to separate three-phase windings of the motor 28, thereby allowing the use of readily available, low cost IGBT switching circuits. The first and second power bridges 48 and 50, respectively, receive control signals from and send status signals, e.g., BIT signals, to the vector control board 46.

The input filter and DC relay control unit 44, which includes the electric vehicle relay assembly of the present invention, comprises electrical connections for coupling a 320 volt output of the power distribution module 20 to the first and second power bridges 48 and 50, respectively. The input filter and DC relay control unit 44 includes EMI filtering, a relay circuit for disconnecting the coupling of the 320 volt output of the power distribution module 20 to the first and second power bridges 48 and 50, respectively, and various BIT circuits including voltage sense circuits and a chassis ground fault circuit. Preferably, the input filter and DC relay control unit 44 receives control signals from and sends status signals, e.g., BIT signals, to the vector control board 46.

Figure 3:
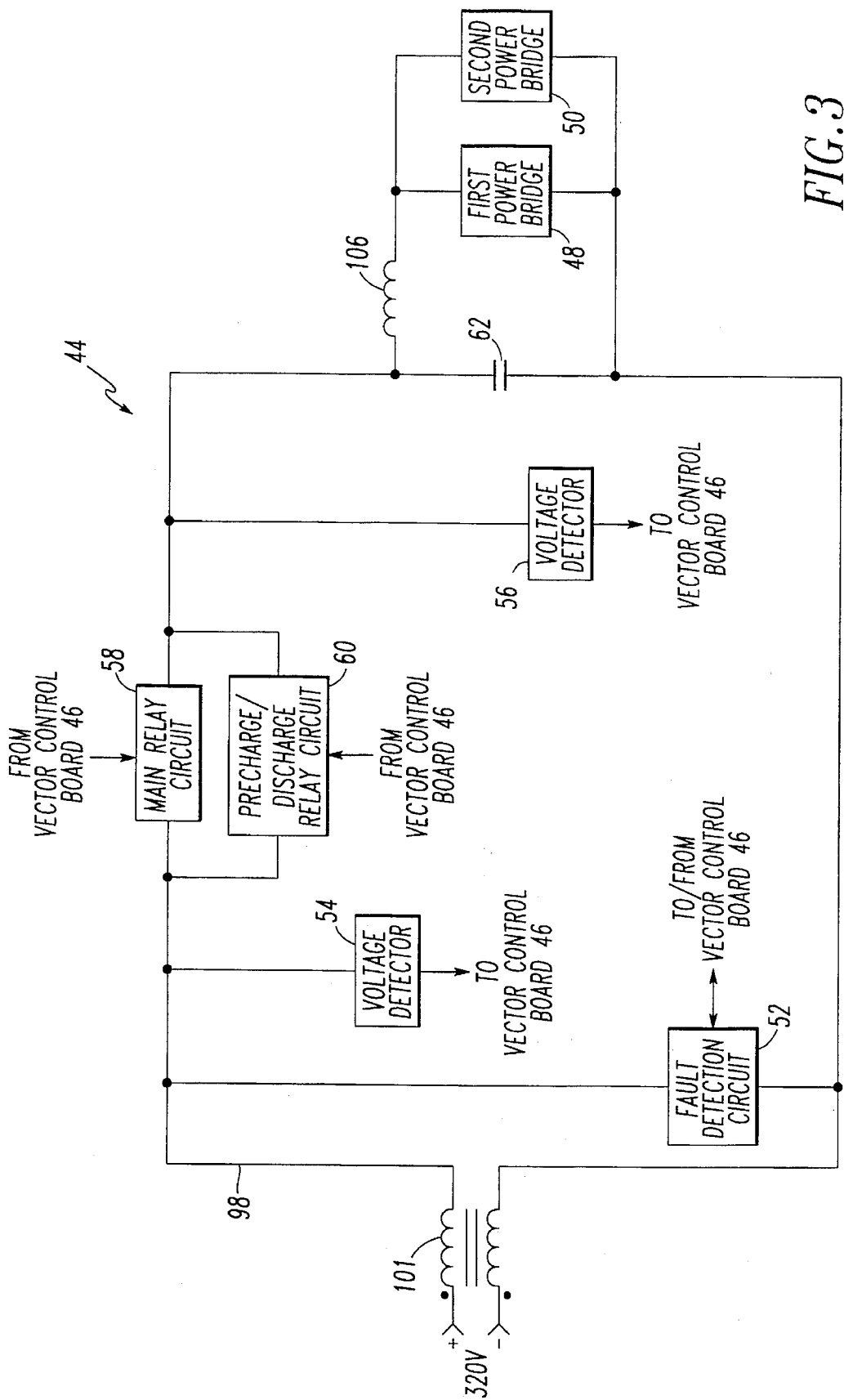
FIG. 3 is an electrical diagram of the input filter and DC relay control unit of the motor controller of FIG. 2.

FIG. 3 is an electrical diagram of the circuitry comprising the input filter and DC relay control unit 44. As described above, the circuitry couples the 320 volt output of the power distribution module 20 to the first and second power bridges 48 and 50. The circuitry includes a fault detection circuit 52, first and second voltage detectors 54 and 56, a main relay circuit 58, a precharge/discharge relay circuit 60, and a capacitor 62. The fault detection circuit 52 senses leakage current to the vehicle chassis and receives control signals from and sends status signals to the vector control board 46.

Leakage Current to the vehicle chassis must be detected and eliminated to ensure safe vehicle operation.

The first voltage detector 54 senses the input voltage to the input filter and DC relay control unit 44 and sends status signals to the vector control board 46. The second voltage detector 56 senses the voltage being supplied from the main relay circuit 58 and the precharge/discharge relay circuit 60 to the capacitor 62. The second voltage detector 56 also sends status signals to the vector control board 46.

The capacitor 62 has a large capacitance that filters electrical noise and harmonic currents generated by operation of the first and second power bridges and prevents such noise and harmonics from being conducted back to other circuits within the vehicle using the same power source. The capacitor 62 also stores energy to assist in operation of the first and second power bridges 48 and 50. Preferably, the capacitor 62 is a 3500 µf electrolytic capacitor.

In response to control signals from the vector control board 46, the main relay circuit 58 selectively connects and disconnects the 320 volt output of the power distribution module 20 to and from the first and second power bridges 48 and 50, respectively. As described hereinabove, in conventional relay circuits, when the 320 volt output is initially supplied, i.e the main relay switch is closed, a large inrush current flowing into the capacitor can damage the capacitor and cause other undesirable effects to electric vehicle components.

In order to avoid these problems and in accordance with the present invention, the input filter and DC relay control unit 44 includes a precharge/discharge relay circuit 60. The precharge/discharge relay circuit 60 connects the capacitor 62 to the 320 volt output of the power distribution module 20 through a relatively high impedance while the capacitor 62 slowly charges and voltage across its terminals increases from zero to full voltage. Once full voltage is achieved, the main relay circuit closes, thus removing the impedance so that full power can flow to the capacitor 62 and beyond. Command signals from the vector control board 46 control the operation of the precharge/discharge relay circuit 60 and the main relay circuit 58.

Figure 4:
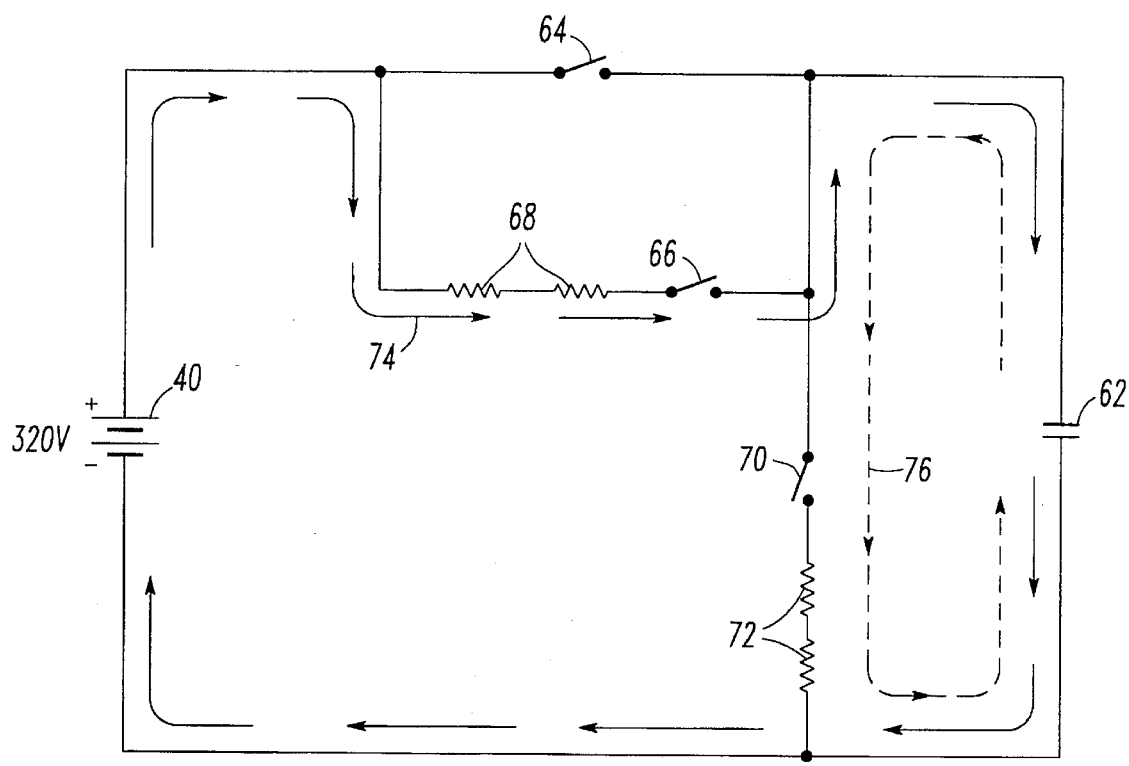
FIG. 4 is an electrical diagram of the main relay circuit and precharge/discharge relay circuit of the input filter and DC relay control unit of FIG. 3.

FIG. 4 shows an electrical diagram of the main relay circuit 58 and precharge/discharge relay circuit 60, including main relay contacts 64, precharge relay contacts 66, precharge relay resistors 68, discharge relay contacts 70, and discharge relay resistors 72. In response to control signals from the vector control board 46, when the 320 volt output is initially applied, the precharge relay contacts 66 close while the main relay contacts 64 remains open, inserting precharge relay resistors 68, preferably 20 ohms each, into the precharge power path (denoted by double-headed arrows 74). Once full battery voltage is sensed by the voltage detector 56 (FIG. 3) and a status signal is sent to the vector control board 46, the vector control board 46 causes the precharge relay contacts 66 to open and the main relay contacts 64 to close in order to supply full power to the capacitor 62 and beyond.

When the 320 volt output is removed, i.e. the power supply is cut off, the capacitor 62 must be discharged to remove high voltage from the motor controller 18 so as to leave the motor controller 18 in a safe state during non-operation, especially for servicing. The precharge/discharge relay circuit 60 discharges the capacitor 62 in response to control signals from the vector control board 46. During discharge, the main relay contacts 64 and the precharge relay contacts 66 remain open, while the discharge relay contacts 70 close to insert discharge relay resistors 72 in the discharge path (denoted by dashed arrows 76). The discharge relay resistors 72, preferably 700 ohms each, dissipate the residual voltage from the capacitor 62 to place the motor controller 18 in a safe state. In the preferred embodiment, the capacitor 62 thus discharges in about 25 seconds.

Figure 5:
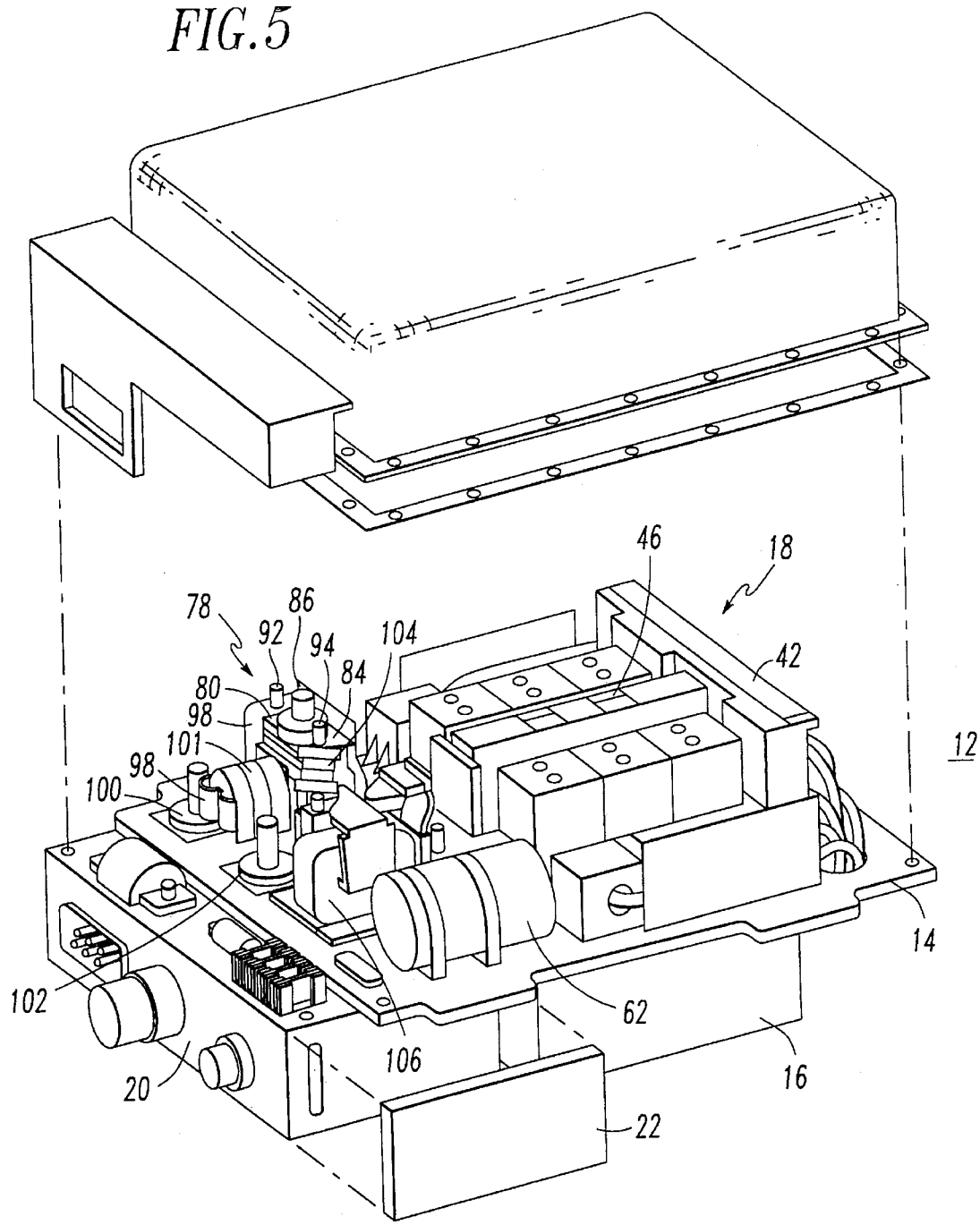
FIG. 5 is an exploded perspective view of the system control unit, according to an embodiment of the present invention, for use in the electric vehicle propulsion system of FIG. 1.
Figure 6:
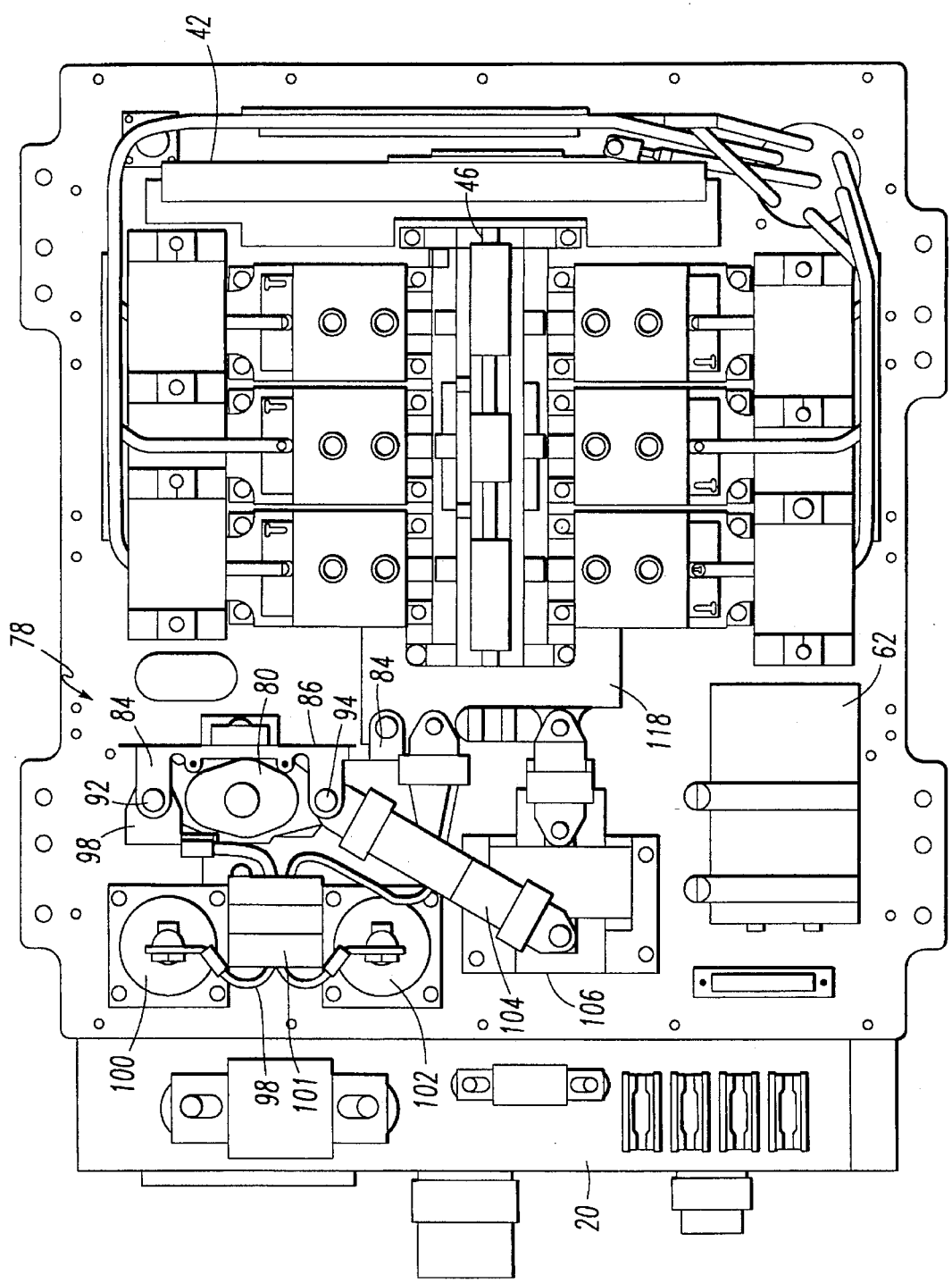
FIG. 6 is a top view without a cover of the system control unit shown in FIG. 5.

FIGS. 5 and 6 show an embodiment of the system control unit 12 that includes the input filter and DC relay control unit 44 according to the present invention. As described hereinabove, the system control unit 12 includes the cold plate 14 on which electrical components, including the battery charger 16, motor controller 18, power distribution module 20, and chassis controller 22, are mounted.

Figure 7:
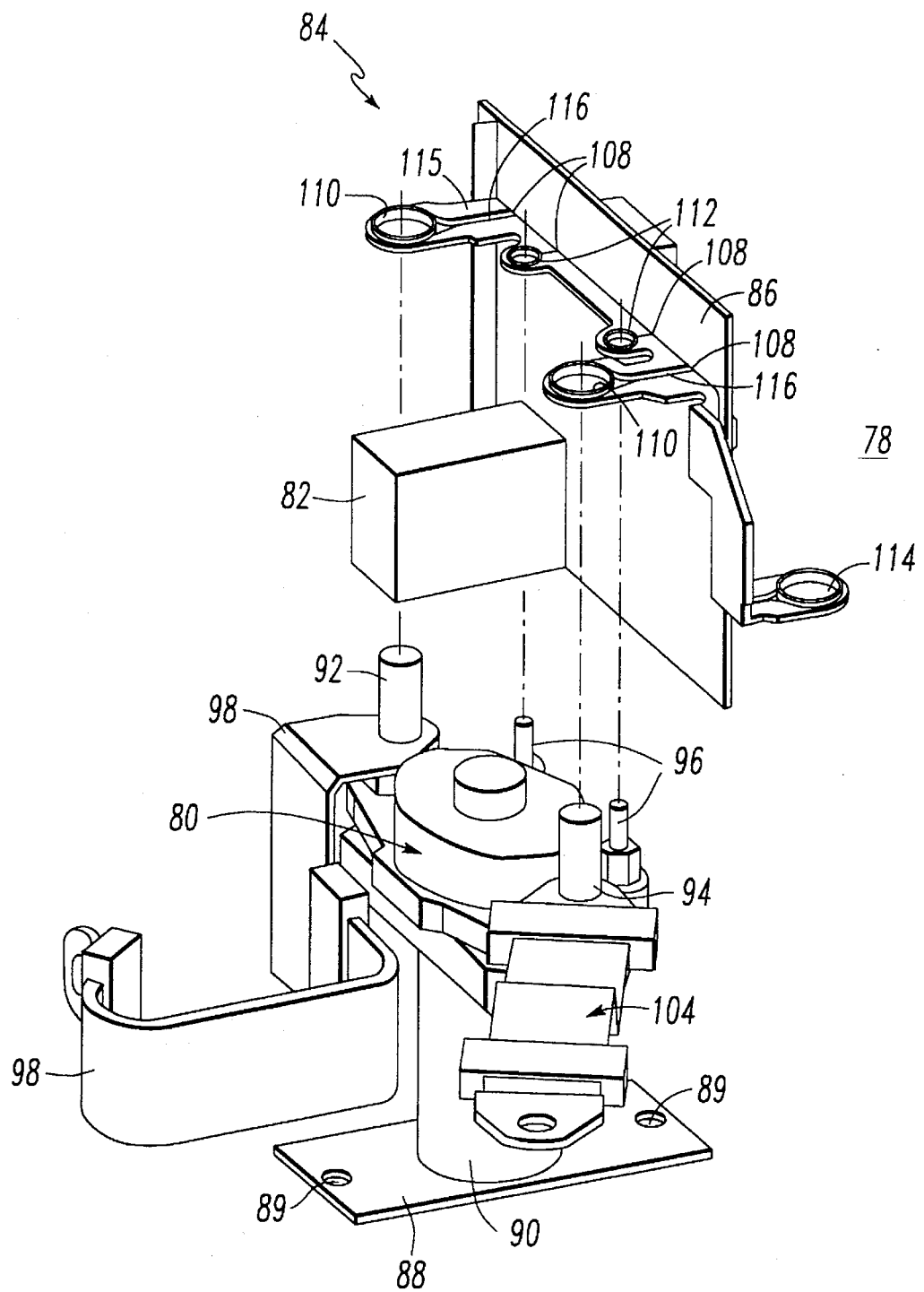
FIG. 7 is an exploded perspective view of an electric vehicle relay assembly shown in the system control unit of FIG. 5., according to an embodiment of the present invention.

FIG. 7 shows an electric vehicle relay assembly 78 for use in the input filter and DC relay control unit 44, according to an embodiment of the present invention. A main relay 80, precharge/discharge relay 82, flexible circuit 84, and relay PWA (printed wiring assembly) 86 are mechanically and electrically integrated to form the relay assembly 78. The relay assembly 78 is mounted onto the cold plate 14 via a mounting plate 88 having a pair of holes 89 for fastening screws.

The main relay 80 includes a main relay coil contained within a cylinder 90, first and second electrically conductive studs 92 and 94, respectively, and a pair of main relay coil terminal rods 96. The main relay coil is electrically connected to the coil terminal rods 96, which supply current in order to energize the coil. The energizing of the coil causes current to pass from the first stud 92 to the second stud 94 through the main relay contacts 64, not visible in FIG. 7.

An input cable connector 98 is electrically connected at one end to the first stud 92 and at its other end to a first feed-through capacitor 100 of the motor controller 18, as shown in FIGS. 5 and 6. A common-mode choke 101 is provided to couple the feed-through capacitors 100 and 102 with the input filter and DC relay control unit 44. Power for the motor controller 18 is routed by the power distribution module 20 through the feed-through capacitors 100 and 102. The first feed-through capacitor 100 supplies current from the battery 40 to the relay assembly 78 at the first stud 92.

An inductor cable connector 104 is electrically connected at one end to the second stud 94 of the main relay and at its other end to the inductor 106 (FIGS. 3, 5, and 6). When either the main relay contacts 64 or the precharge relay contacts 66 is closed and power is supplied to the motor controller 18, current passes through the inductor cable connector 104 to the inductor 106, which is preferably 10 multi-henri, and the capacitor 62. The inductor 106 is a component of the EMI filter assembly.

The precharge/discharge relay 82 includes a precharge/discharge relay coil and precharge and discharge relay contacts 66 and 70 respectively. The precharge/discharge relay 82 is both mechanically secured and electrically connected to the relay PWA 86, preferably by soldering.

The relay PWA 86 includes on a single rigid printed circuit board both the main relay circuit 58 and the precharge/discharge relay circuit 60 that energize the main relay coil and the precharge/discharge relay coil. When the precharge/discharge relay coil is energized, the precharge contacts 66 close and the discharge contacts 70 open. When not energized, the precharge contacts 66 are open and the discharge contacts 70 remain closed.

The relay PWA 86 is mounted onto the main relay 80 by the flexible circuit 84, which provides both mechanical and electrical connections between the main relay 80 and the relay PWA 86. The flexible circuit 84 includes a plurality of notches 108 (FIG. 7) passing through and soldered to the relay PWA. The flexible circuit 84 is comprised of a sandwich of flexible electrically insulative KAPTON tape 115 and copper etched traces 116 and further includes conductive-edged holes 110, 112, and 114. The holes 110 mechanically and electrically engage the studs 92 and 94 of the main relay 80, while the holes 112 engage the main relay coil terminal rods 96. The conductive edges of hole 114 electrically connect the relay PWA 86 to the first and second power bridges 48 and 50 via a bus bar 118 shown in FIG. 6. The copper etched traces 116 electrically connect the studs 92 and 94, main relay coil terminal rods 96, and bus bar 118 to the circuitry of the relay PWA 86. The use of flexible KAPTON tape 115 allows for tolerance errors between the holes and the studs and coil terminal rods. As Soldering of wires to a printed circuit board is both cumbersome and difficult, the flexible circuit 84 eases manufacture of the relay assembly 78.

The electric vehicle relay assembly combines the aforementioned electrical features of precharge, discharge, and power interruption into a single mechanical assembly. In addition, the drive circuitry necessary to energize the main relay coil and precharge/discharge relay coil is located on a single rigid printed circuit board. These features significantly increase the ease of assembly and decrease the overall size of the relay assembly.

It will be apparent to those skilled in the art that various modifications and variations can be made in the electric vehicle relay assembly of the present invention without departing from the spirit or scope of the invention. Thus, it is intended that the present invention cover the modifications and variations of this invention provided they come within the scope of the appended claims and their equivalents.

We claim:

1. An electric vehicle relay assembly comprising:

a main relay;

a flexible circuit electrically connected to the main relay;

connection means for mounting the flexible circuit onto the main relay; and a wiring board affixed to the flexible circuit, the wiring board including relay circuitry electrically connected to the flexible circuit for controlling the main relay.

2. The electric vehicle relay assembly according to claim 1, wherein the connection means include a pair of studs affixed to the main relay and wherein the flexible circuit includes means for defining a pair of conductive-edged holes therethrough that electrically and mechanically engage the pair of studs.

3. The electric vehicle relay assembly according to claim 2, wherein the connection means further include a pair of coil terminal rods affixed to the main relay, and wherein the flexible circuitry includes means for defining a pair of conductive-edged holes therethrough that electrically and mechanically engage the pair of rods.

4. The electric vehicle relay assembly according to claim 3, wherein the flexible circuit includes flexible electrically insultive tape to compensate for inaccurate tolerances between the pair of studs and the pair of holes that mechanically engage the pair of studs and between the pair of coil terminal rods and the pair of holes that mechanically engage the pair of rods.

5. The electric vehicle relay assembly according to claim 2, wherein the flexible circuit includes etched copper traces for electrically connecting the main relay studs to the wiring board.

6. The electric vehicle relay assembly according to claim 1, further including a precharge relay electrically connected to the relay circuitry for precharge of an input capacitor of an electric vehicle motor controller.

7. The electric vehicle relay assembly according to claim 6, comprising means mechanically securing the precharge relay to the wiring board.

8. The electric vehicle relay assembly according to claim 6, wherein the precharge relay selectively precharges and discharges the input capacitor of the electric vehicle motor controller.

* * * * *